United States Patent
Goldstein

(10) Patent No.: US 12,228,162 B2
(45) Date of Patent: Feb. 18, 2025

(54) MULTIPLE FASTENER RESTRAINER AND METHODS IMPLEMENTING THE SAME

(71) Applicant: Atlas Tube Connections, LLC, Chicago, IL (US)

(72) Inventor: Edward Goldstein, Douglaston, NY (US)

(73) Assignee: Atlas Tube Connections, LLC, Chicago, IL (US)

( * ) Notice: Subject to any disclaimer, the term of this patent is extended or adjusted under 35 U.S.C. 154(b) by 203 days.

(21) Appl. No.: 17/983,927

(22) Filed: Nov. 9, 2022

(65) Prior Publication Data

US 2023/0147999 A1    May 11, 2023

Related U.S. Application Data

(60) Provisional application No. 63/277,352, filed on Nov. 9, 2021.

(51) Int. Cl.
*F16B 37/04* (2006.01)
*F16B 39/282* (2006.01)

(52) U.S. Cl.
CPC .......... *F16B 37/044* (2013.01); *F16B 39/282* (2013.01); *F16B 37/04* (2013.01)

(58) Field of Classification Search
CPC ........ F16B 37/02; F16B 37/04; F16B 37/044; F16B 39/08; F16B 39/10; F16B 39/14; F16B 39/282
USPC .......................... 411/190–191, 204, 211–212
See application file for complete search history.

(56) References Cited

U.S. PATENT DOCUMENTS

| | | | |
|---|---|---|---|
| 2,344,102 A * | 3/1944 | Meisterhans | F16B 37/048 411/969 |
| 2,394,729 A | 2/1946 | Tinnerman | |
| 3,446,261 A * | 5/1969 | Dey | F16B 27/00 411/85 |
| 4,676,706 A * | 6/1987 | Inaba | F16B 37/044 411/432 |
| 4,895,484 A * | 1/1990 | Wilcox | F16B 37/044 411/85 |
| 5,137,406 A * | 8/1992 | Cosenza | F16B 37/044 411/113 |
| 8,277,158 B2 * | 10/2012 | Csik | F16B 37/046 411/111 |
| 8,469,413 B2 * | 6/2013 | Novajovsky | E05B 15/0245 292/DIG. 60 |
| 11,519,451 B2 | 12/2022 | Goldstein | |
| 2016/0223133 A1 | 8/2016 | Peters et al. | |
| 2017/0074312 A1 | 3/2017 | Thielmann et al. | |
| 2018/0347614 A1 * | 12/2018 | Reznar | F16B 37/046 |

(Continued)

FOREIGN PATENT DOCUMENTS

| | | |
|---|---|---|
| EP | 1741938 A1 | 1/2007 |
| EP | 2175148 A2 | 4/2010 |

OTHER PUBLICATIONS

International Patent Application No. PCT/US2022/049377; Int'l Search Report and the Written Opinion; dated Feb. 17, 2023; 10 pages.

*Primary Examiner* — Roberta S Delisle
(74) *Attorney, Agent, or Firm* — BakerHostetler

(57) ABSTRACT

A nut restrainer includes a mobile portion; and a fixed portion. The mobile portion may include at least one cavity configured to accept insertion of a nut and prevent rotation of the nut with respect to the mobile portion.

37 Claims, 17 Drawing Sheets

(56) References Cited

U.S. PATENT DOCUMENTS

| | | |
|---|---|---|
| 2020/0003248 A1* | 1/2020 | Yuan .................... F16B 37/044 |
| 2020/0284279 A1 | 9/2020 | Gao et al. |
| 2020/0355214 A1 | 11/2020 | Schlenker |
| 2021/0131477 A1 | 5/2021 | Goldstein |
| 2021/0317865 A1 | 10/2021 | Goldstein |

* cited by examiner

MULTIPLE FASTENER RESTRAINER AND METHODS IMPLEMENTING THE SAME

CROSS-REFERENCE TO RELATED APPLICATIONS

This application claims the benefit of U.S. Provisional Application No. 63/277,352 filed on Nov. 9, 2021, which is hereby incorporated by reference in its entirety for all purposes as if fully set forth herein.

FIELD OF THE DISCLOSURE

The disclosure relates to a fastener restrainer. The disclosure further relates to methods implementing a fastener restrainer. The disclosure relates to a multiple fastener restrainer. The disclosure further relates to methods implementing a multiple fastener restrainer. The disclosure particularly relates to a multiple nut restrainer. The disclosure further particularly relates to methods implementing a multiple nut restrainer.

BACKGROUND OF THE DISCLOSURE

Use of high-strength bolted connections (including, for example, bolts conforming to ASTM F3125, nuts conforming the ASTM A563, and washers conforming to ASTM F436) is widespread in the construction industry to join steel elements of buildings, bridges and other structures. Bolted assembly is often preferred to the use of welding due to the simplicity and speed of installing bolts on a construction site. However, proper installation of high-strength bolted connections typically requires access to both sides of the parts being connected, making the use of high strength bolts impossible in many cases. In other cases, engineers may sacrifice material efficiency to facilitate the use of bolted connections, for example, by using steel members with I-shaped cross-sections instead of those with more efficient box-shaped cross sections.

Nut restrainers, nut cages, and similar products have been widely used in applications including sheet metal fabrication, but such nut restrainers have drawbacks that prevent wide adoption within the steel construction industry. First, many building codes include or reference prescriptive standards regarding the size, shape, and material properties of nuts, bolts, washers and holes, as well as spatial relations within the connection, methods of installation, and methods of inspection. Hardware or practices that do not conform to those prescriptive standards may require additional testing, approvals and training to be used in conformance with the applicable building code, thus increasing the cost to the installer. Thus, for any nut restrainer to be widely adopted in the construction industry, it must be compatible with standard industry hardware and practices.

Second, tolerances during structural member fabrication, and variability in the size and shape of structural members, either due to temperature variations or external forces imposed on the member at the time of erection, mean that a restrained nut must be able to accept a bolt inserted non-concentrically with the nut. While several disclosures have sought to address this issue using "floating nuts," these approaches generally include custom nuts or bolts, rather than being compatible with readily available hardware, severely limiting their adoption by the construction industry.

In the absence of nut restrainers well suited to the needs of the construction industry, several other products and practices exist to address the need for bolted connections when access is available from one side only. However, all suffer from drawbacks when compared to typical high strength bolting. These include the following three products and practices:

Welding a nut to the inaccessible side of the part in advance of site assembly. This approach allows the bolt to be tightened from one side but violates standards commonly referenced by building codes, which state that nuts conforming to ASTM A563 shall not be welded. This practice also reduces installation tolerances by fixing the nut's location with respect to the bolt hole.

Blind bolts, which come in a variety of proprietary and non-proprietary forms, can be installed and tightened from one side, but generally have smaller allowable load-carrying capacities than traditional high strength bolted connections. Blind bolts are generally more complex and expensive than high strength bolts, and typically cannot be used in connections where the bolt must tightly clamp the pieces of steel being joined, also known as slip critical connections.

Tapped holes have threads cut into the interior of the hole in the material on the inaccessible side. This approach requires high precision, increases fabrication time, reduces installation tolerances, and typically cannot be used in connections where the bolt must tightly clamp the pieces of steel being joined.

Accordingly, what is needed is a product that allows for the installation of high strength bolted connections from one side at low cost, without reductions in load-carrying capacity, while preserving installation tolerances, which would allow more efficient structures to be erected at a lower cost than is possible with current practice.

SUMMARY OF THE DISCLOSURE

In one general aspect, a nut restrainer includes a mobile portion. The nut restrainer in addition includes a fixed portion. The nut restrainer moreover includes the mobile portion that may include at least one cavity configured to accept insertion of a nut and prevent rotation of the nut with respect to the mobile portion.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 1c shows a three-dimensional view of a mobile portion in isolation according to FIG. 1a.

FIG. 1d shows a three-dimensional view of the fixed portion in isolation according to FIG. 1a.

FIG. 3c shows a three-dimensional view of a single mobile portion in isolation according to FIG. 3a.

FIG. 3d shows a three-dimensional view of the fixed portion in isolation according to FIG. 3a.

FIG. 4c shows an elevation view of the embodiment according to FIG. 4a.

FIG. 4d shows a top view of the embodiment according to FIG. 4a.

FIG. 5b shows a three-dimensional view of the fixed portion according to FIG. 5a.

FIG. 5c shows a three-dimensional view of the mobile portion according to FIG. 5a.

DETAILED DESCRIPTION

Figure 1A:
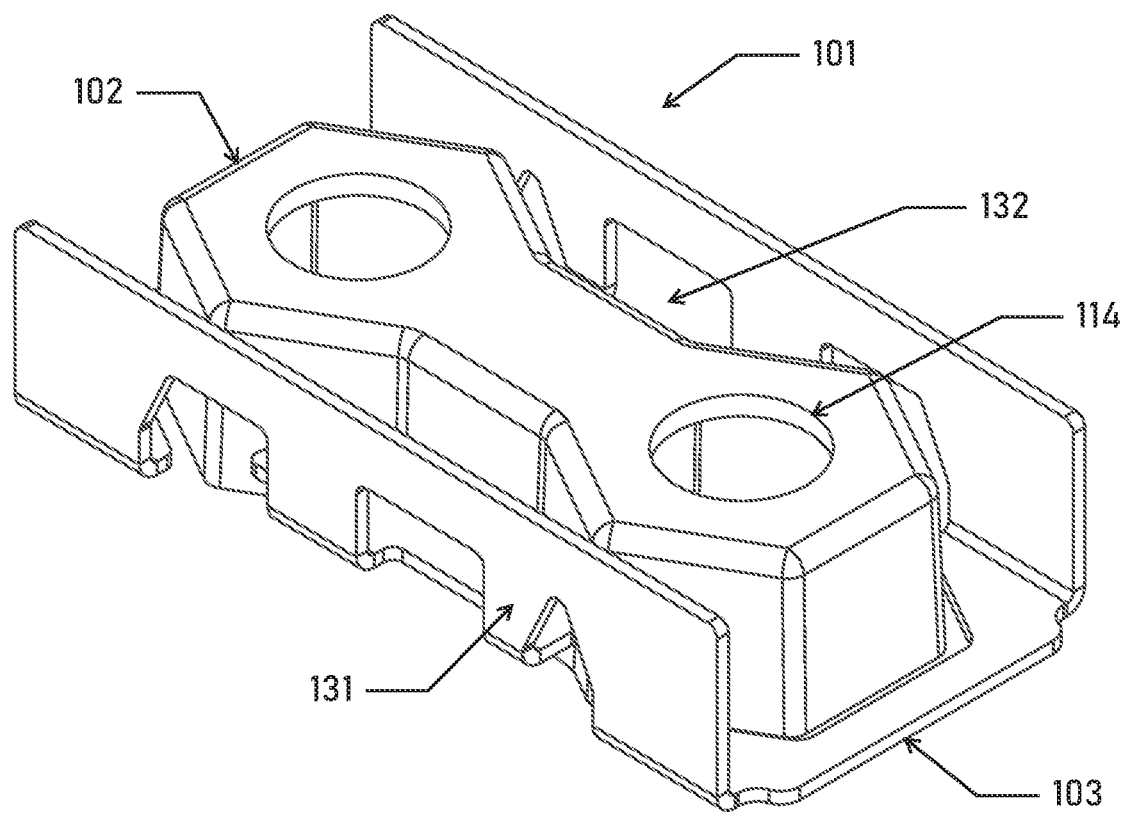
FIG. 1a and FIG. 1b illustrate three-dimensional views of an embodiment of the disclosure.

The disclosure will now be described with reference to the drawing figures, in which like reference numerals refer to like parts throughout.

The disclosed multiple fastener restrainer may implement one or more of a number of different versions. The first version may include one fixed portion and one or more mobile portions with two or more cavities each as illustrated in FIG. 1, FIG. 2 and FIG. 5. A second version may include one fixed portion and two or more mobile portions with one cavity each as illustrated in FIG. 3. A third version may include one fixed portion and one mobile portion with one cavity as illustrated in FIG. 4

The disclosed multiple fastener restrainer may be configured such that the fastener, such as a nut, cannot fall out. In this regard, a mobile portion may be configured to stay held to a plate.

The disclosed multiple fastener restrainer may be configured such that it restrains rotation of the fastener, such as a nut.

The disclosed multiple fastener restrainer may be configured such that it is attachable to a substrate having a fastener hole, such as a bolt hole.

The disclosed multiple fastener restrainer may be configured such that it has a fixed portion that does not restrain rotation of the mobile portion when tightening a fastener, such as a bolt. In this case, rotation may be restrained by contact between the mobile portion and some material that is not part of the nut restrainer, such as for example direct or indirect contact with a bolt in an adjacent hole, as illustrated in FIG. 1, FIG. 2, FIG. 3, and FIG. 5 or contact with an adjacent restrainer or other material as in FIG. 4.

The disclosed multiple fastener restrainer may be configured to limit lateral movement of nut. For example, the nut stays reasonably aligned with the bolt hole so that it is positioned to accept the bolt.

The disclosed multiple fastener restrainer may be configured with a hole, a void, an aperture, and/or the like to allow the tip of the bolt to extend past the nut.

The disclosed multiple fastener restrainer may be configured with means of positioning to sufficiently align with the bolt hole. In particular, sufficient may depend on the other elements of the restrainer and fastener.

The disclosed multiple fastener restrainer may be configured with some lateral movement to preserve tolerance and/or adjustability. For example, accept a bolt that is slightly off center.

The disclosed multiple fastener restrainer may be configured to accept off-the-shelf fasteners, such as nuts and bolts. For example, the restrainer's functionality is configured to not depend on any specific features of the nut, beyond being non-axisymmetric. In aspects, the disclosed multiple fastener restrainer may be configured to accept prismatic shaped nuts, polygonal shaped nuts, nuts having at least three flat side portions, nuts having at least four flat side portions, nuts having at least five flat side portions, nuts having at least six flat side portions, nuts having at least seven flat side portions, nuts having at least eight flat side portions, nuts having three flat side portions, nuts having four flat side portions, nuts having five flat side portions, nuts having six flat side portions, nuts having seven flat side portions, nuts having eight flat side portions, and/or the like.

The disclosed multiple fastener restrainer may be configured to arrange the fastener, such as nut, in contact with the substrate. The disclosed multiple fastener restrainer may be configured to be in contact with only one face of a substrate plate (as opposed to clipping over the side of the plate or into the bolt hole).

The disclosed multiple fastener restrainer may be configured such that no material (sleeves, gaskets, etc.) may be between the shank of the bolt and the edges of the holes in the plates.

Figure 1B:
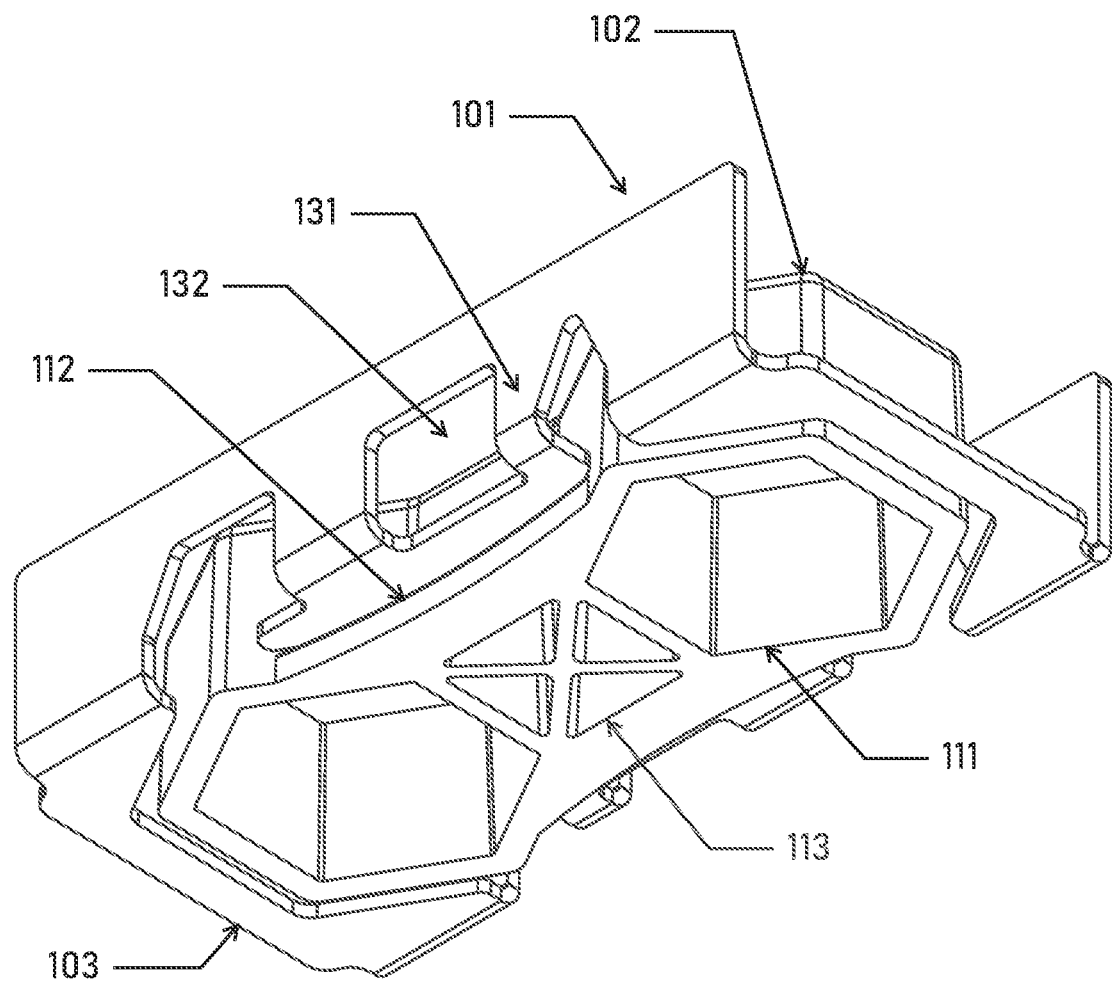

FIG. 1a and FIG. 1b illustrate three-dimensional views of an embodiment of the disclosure.

Figure 1C:
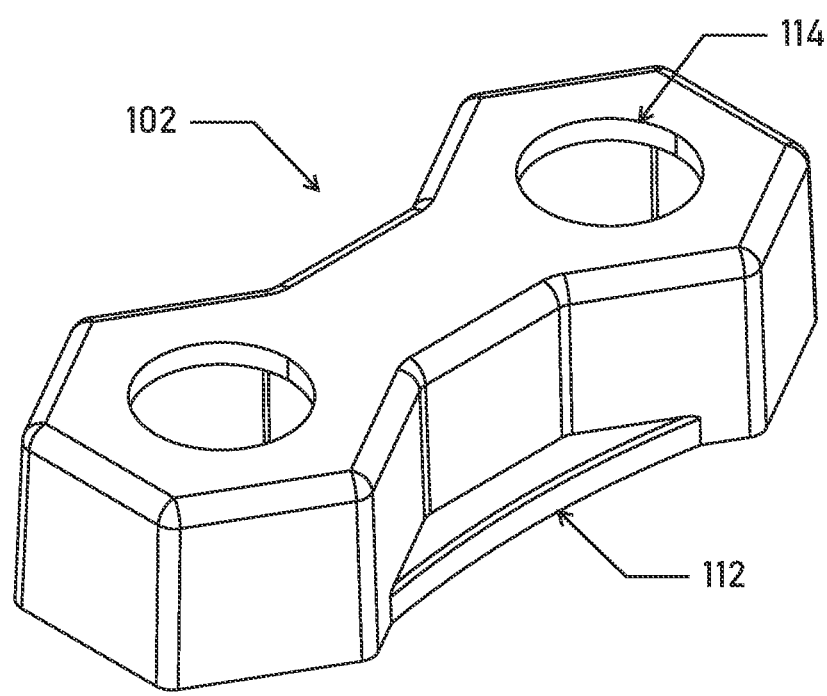

FIG. 1c shows a three-dimensional view of a mobile portion in isolation according to FIG. 1a.

Figure 1D:
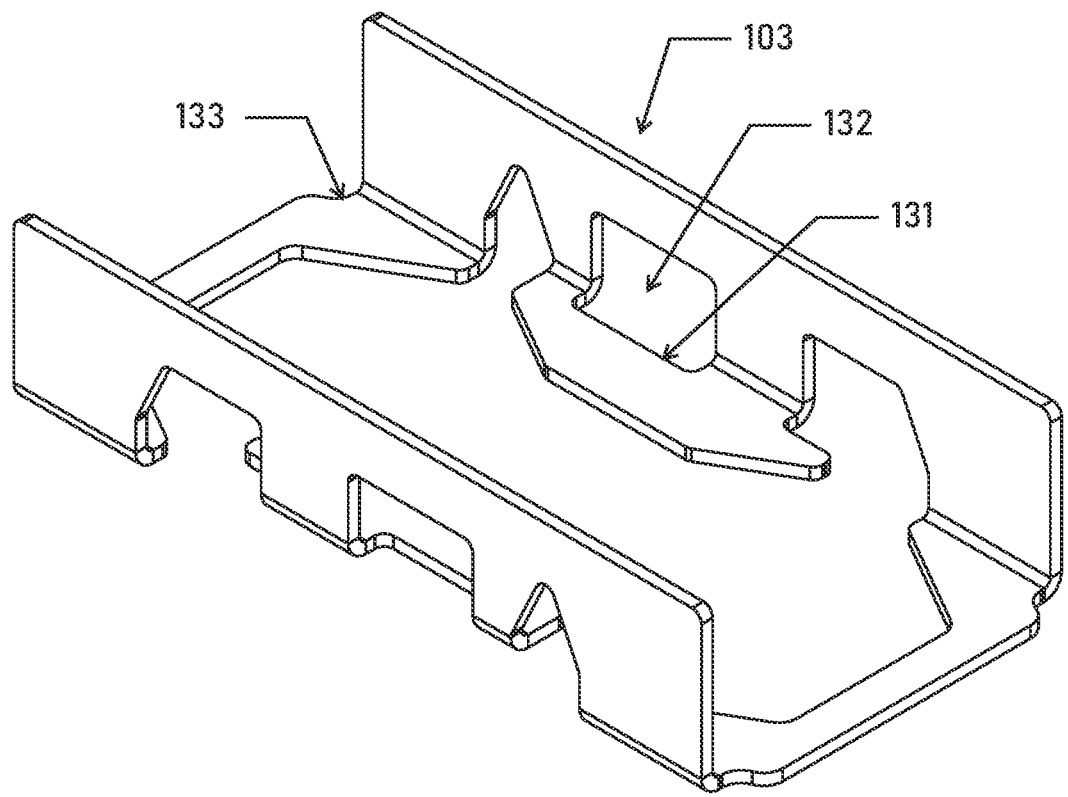

FIG. 1d shows a three-dimensional view of the fixed portion in isolation according to FIG. 1a.

The aspects illustrated in FIG. 1a, FIG. 1b, FIG. 1c, and FIG. 1d may include any other aspects as described herein. Additionally, aspects of the disclosure may be implemented with any type of fasteners. However, for ease of description, the disclosure will describe reference to a nut and bolt fastener implementation. However, the disclosure is equally applicable to a number of other types of fastener types.

In particular, FIG. 1 illustrates a nut restrainer 101 that may include a mobile portion 102 and a fixed portion 103. The mobile portion 102 may include two cavities 111. Additionally, each of the cavities 111 may be configured to accept insertion of a nut, and each of the cavities 111 may be configured to prevent rotation of the nut with respect to the mobile portion 102. In particular, each of the cavities 111 may be configured to accept insertion of a nut, and each of the cavities 111 may be configured to prevent rotation of the nut with respect to the mobile portion 102 when torque is imposed on the nut by a bolt being tightened with the nut. In other aspects, the mobile portion 102 may include more than two of the cavities 111 (not shown). In other aspects, the mobile portion 102 may include three of the cavities 111 (not shown). In other aspects, the mobile portion 102 may include four of the cavities 111 (not shown).

The mobile portion 102 may be further configured so that once two bolts have been threaded with nuts within the cavities 111, torque applied to a nut in one of the cavities 111 may be resolved as a contact force between the mobile portion 102 and the nut in the other one of the cavities 111. In aspects, the mobile portion 102 together with the cavities 111 may be configured so that once two bolts have been threaded with nuts within the cavities 111, torque applied to a nut in one of the cavities 111 may be resolved as a contact force between the mobile portion 102 and the nut in the other one of the cavities 111.

The mobile portion 102 may also include protrusions 112, which may extend laterally from a body of the mobile portion 102. In aspects, the protrusions 112 may be located on a lower side of the mobile portion 102 adjacent a surface of the substrate plate. In aspects, the protrusions 112 may be arranged between an adjacent the cavities 111. In aspects, the protrusions 112 may be formed integrally with the body of the mobile portion 102. In aspects, the mobile portion 102 may be formed of a plastic material, a synthetic material, a metallic material, a ceramic material, and/or the like.

The fixed portion 103 may include flexible protrusions 131. The flexible protrusions 131 may extend vertically downward from the sides of the fixed portion 103. In aspects, the flexible protrusions 131 may extend vertically downward from the sides of the fixed portion 103 and include a bend such that the flexible protrusions 131 extend inwardly toward a central portion of the fixed portion 103. In aspects, the flexible protrusions 131 may include a bend between side portions of the flexible protrusions 131 and bottom portions of the flexible protrusions 131.

In aspects, the protrusions 112 of the mobile portion 102 may be configured and arranged to engage with the flexible protrusions 131 of the fixed portion 103. In aspects, the protrusions 112 of the mobile portion 102 may be configured and arranged to engage with the flexible protrusions 131 of the fixed portion 103 if a net force acts on the mobile portion 102 pushing it away from the substrate plate to which the nut restrainer 101 is mounted and/or attached. Accordingly, the configuration, arrangement, and engagement of the protrusions 112 and the flexible protrusions 131 thereby may prevent the mobile portion 102 from being forced away from the substrate plate. In this embodiment, the protrusions 112 may also increase a flexural rigidity of a portion of the central portion of the mobile portion 102 that lies between the cavities 111.

The mobile portion 102 may include one or more hollow portions 113 that may be arranged between the two cavities 111 to reduce weight and improve manufacturability. In aspects, the one or more hollow portions 113 may be arranged with an open portion on a lower surface of the mobile portion 102 adjacent the substrate plate. In aspects, the one or more hollow portions 113 may extend from the lower surface of the mobile portion 102 toward a top surface of the mobile portion 102. In aspects, the one or more hollow portions 113 may not extend through the top surface of the mobile portion 102.

In aspects, the mobile portion 102 may include holes 114 arranged in the top surface of the mobile portion 102. In aspects, the holes 114 may be concentric with the cavities 111. Moreover, the holes 114 may be structured and arranged in the mobile portion 102 to allow the tip of a bolt threaded with a nut within either one of the cavities 111 to extend past the nut and pass the upper surface of the mobile portion 102. Accordingly, the nut restrainer 101 may implement any length bolt.

The fixed portion 103 may be configured to be welded, for example at its corners, to a substrate plate having two or more bolt holes. In this regard, the fixed portion 103 may be configured with flat lower surfaces for engagement with the substrate plate. Additionally, the flat lower surfaces of the fixed portion 103 may be arranged to allow for welding of the fixed portion 103 to the substrate plate. In further aspects, the fixed portion 103 may be configured to be attached by adhesive, mechanical means, such as screws, and/or the like.

Additionally, the fixed portion 103 may include the flexible protrusions 131, which may be configured to hold the mobile portion 102 in a position where the cavities 111 are substantially concentric with the bolt holes. In aspects, the flexible protrusions 131 may be configured to deform when acted on by a lateral force, allowing the mobile portion 102 and its contents to move laterally, such as when a bolt is inserted non-concentrically within a bolt hole and imposes a lateral force on the nut within one of the cavities 111. The flexible protrusions 131 may be further configured to be stiffer in a vertical direction (a direction perpendicular to a surface of the substrate plate) than in a lateral direction (a direction parallel to a surface of the substrate plate).

The fixed portion 103 may be configured with cutouts 132. The cutouts 132 may be configured to allow the flexible protrusions 131 to move away from the mobile portion 102 without contacting the fixed portion 103 of a second implementation of the nut restrainer 101 placed immediately adjacent to, and aligned with a first implementation of the nut restrainer 101 as illustrated.

The flexible protrusions 131 and the cutouts 132 may be point symmetric about a center of the nut restrainer 101 so that the flexible protrusion 131 on either side of the mobile portion 102 may have equal stiffness, and the isthmuses connecting the tips of each implementation of the flexible protrusions 131 to a balance of the fixed portion 103 may be proportioned so that each end of the flexible protrusion 131 may have substantially equal lateral stiffness.

In aspects, the cutouts 132 may be arranged on the inside surfaces of the fixed portion 103. In aspects, the cutouts 132 may be arranged on a lower surface of the fixed portion 103. In aspects, the cutouts 132 may be arranged on the inside surfaces of the fixed portion 103; and the cutouts 132 may be arranged on a lower surface of the fixed portion 103. In aspects, implementations of the flexible protrusions 131 may be arranged on either side of the cutouts 132.

The fixed portion 103 may further include indentations 133. The indentations 133 may be arranged at corners of the fixed portion 103 and may provide a space for a welding electrode to access the edge of the fixed portion 103 even when multiple implementations of the nut restrainer 101 are arranged on a substrate plate in a grid formation. In this regard, the indentations 133 may be arranged on a lower surface of the fixed portion 103 adjacent a location where the fixed portion 103 may be attached to the substrate plate.

The fixed portion 103 can be configured and/or manufactured so that the distance between opposing ones of the flexible protrusions 131 may be less than a width of the central portion of the mobile portion 102, which may cause the fixed portion 103, including the flexible protrusions 131, to flex outwards when the mobile portion 102 is inserted therein, generating internal stresses within the material of the fixed portion 103. In aspects, the mobile portion 102 may be configured such that if the mobile portion 102 undergoes subsequent lateral movement, a relaxation of the internal stresses may cause the flexible protrusions 131 to maintain contact with the mobile portion 102.

Figure 2A:
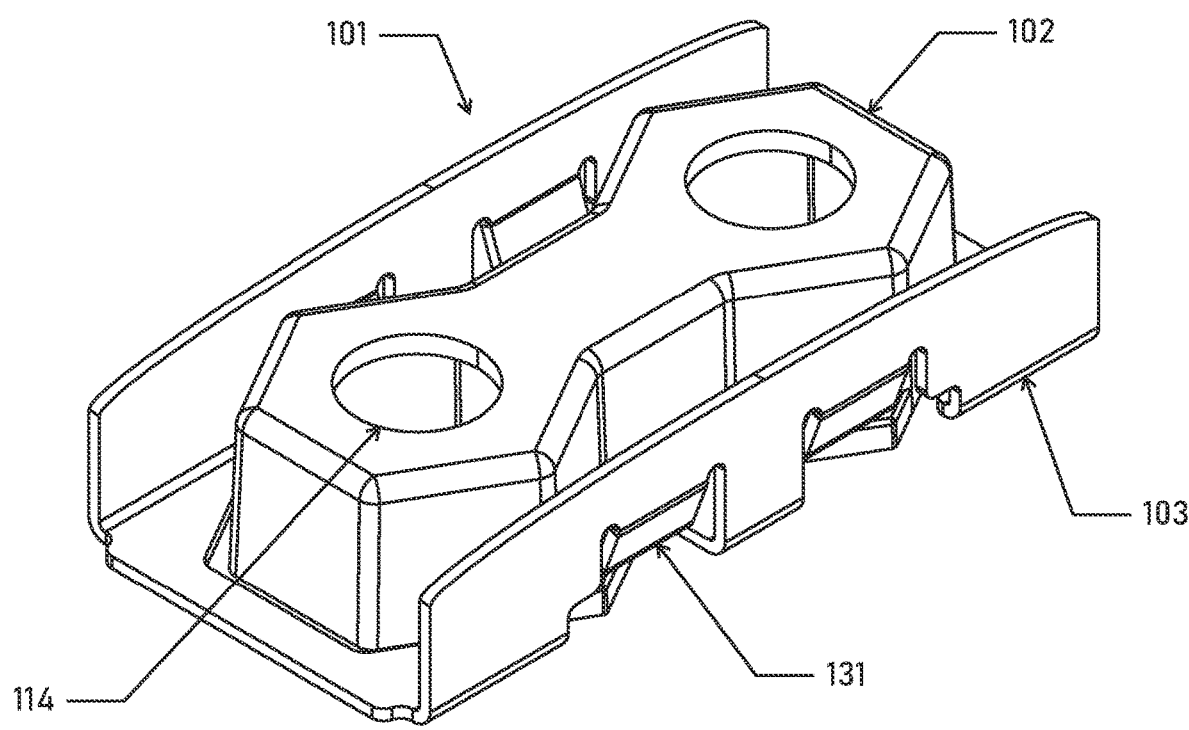
FIG. 2a and FIG. 2b illustrate three-dimensional views of an embodiment of the disclosure.
Figure 2B:
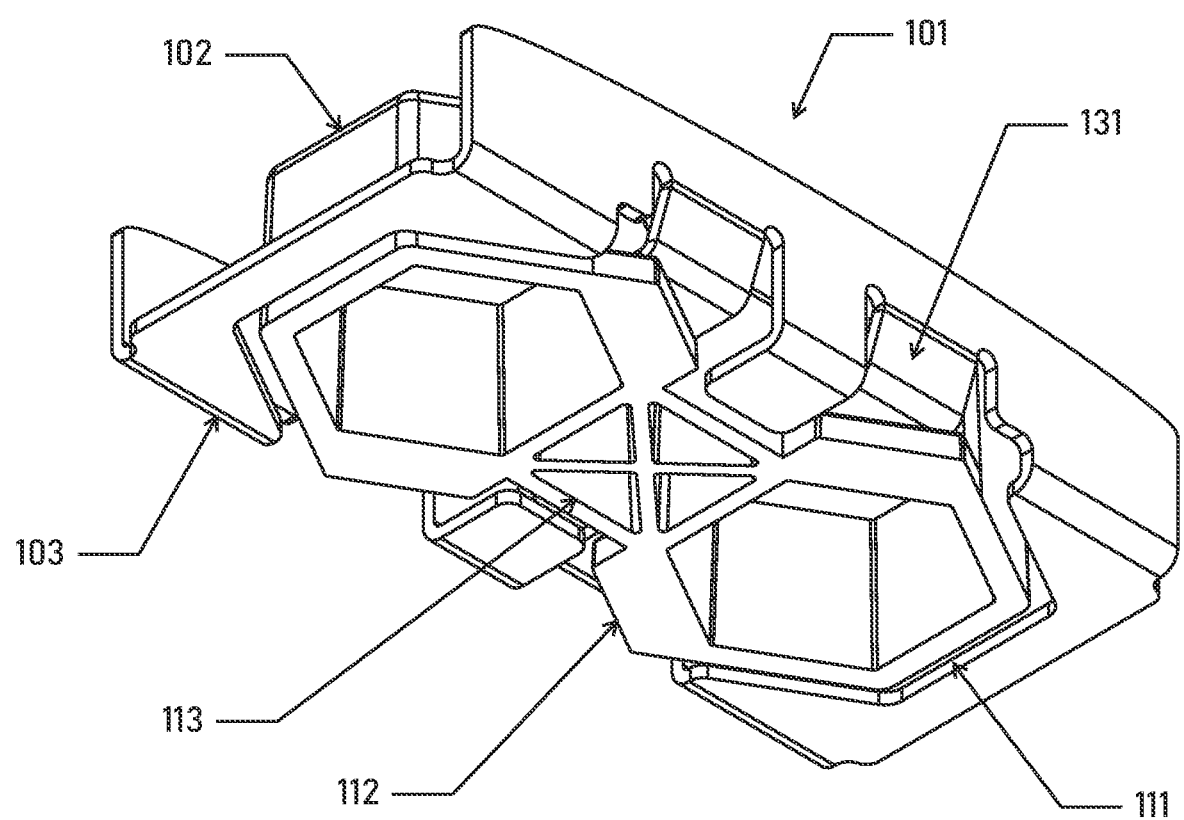

FIG. 2a and FIG. 2b illustrate three-dimensional views of an embodiment of the disclosure from the top and side, and bottom and side, respectively.

The aspects illustrated in FIG. 2a and FIG. 2b may include any other aspects as described herein. In this embodiment, the flexible protrusions 131 may be bent at one or more locations such as, for example two locations, allowing them to deform and move away from the central portion of the mobile portion 102 without extending past a footprint of a rigid outer portion of the fixed portion 103. Accordingly, this configuration of the flexible protrusions 131 may allow for closer adjacent placement of multiple implementations of the nut restrainer 101 as compared to implementations of the nut restrainer 101 having the flexible protrusions 131 extending past a footprint.

In aspects, the mobile portion 102 and the fixed portion 103 may be structured with a gap therebetween. In aspects, the gap between the mobile portion 102 and the fixed portion 103 may be configured to allow the mobile portion 102 to move a limited distance laterally without contacting any part of the fixed portion 103 except for the flexible protrusions 131.

As shown in FIG. 2 (as well as FIG. 1, FIG. 3 and FIG. 4), the flexible protrusions 131 may be configured to resist a movement of the mobile portion 102 in both lateral and vertical (i.e., away from the substrate plate) directions. In aspects, the flexible protrusions 131 may be configured to resist only lateral movement of mobile portion 102. In aspects, the flexible protrusions 131 may be configured with distinct portions of material of the fixed portion 103 to resist vertical movement of the mobile portion 102.

In some aspects, the flexible protrusions 131 may be configured to allow lateral movement and may be part of the mobile portion 102, instead of the fixed portion 103. In some aspects, the fixed portion 103 and the mobile portion 102 may be implemented with a unitary structure where the fixed portion 103 and the mobile portion 102 may be a single piece of material, with the fixed portion 103 and the mobile portion 102 connected by thin, deformable connectors that may hold the mobile portion 102 in place and let the mobile portion 102 move laterally. In aspects, the deformable connectors may not be sufficiently strong to resist the torque associated with tightening.

Figure 3A:
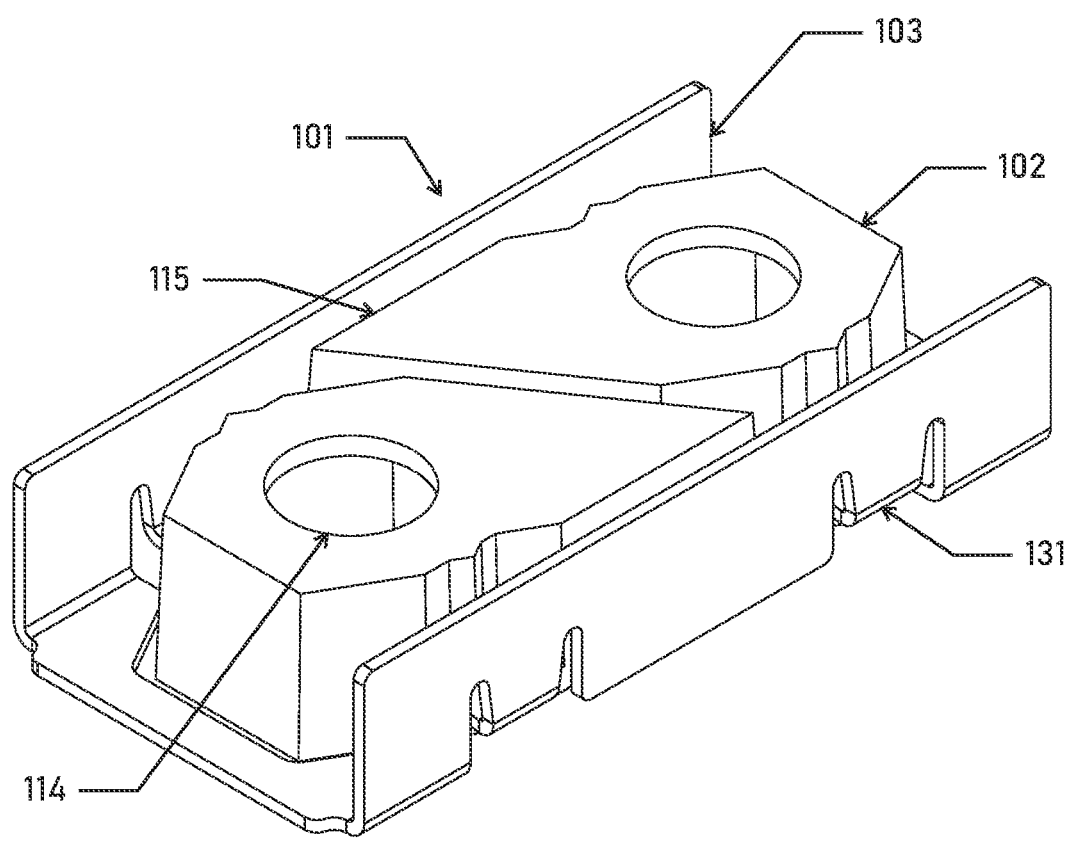
FIG. 3a and FIG. 3b show three-dimensional views of an embodiment of the disclosure.
Figure 3B:
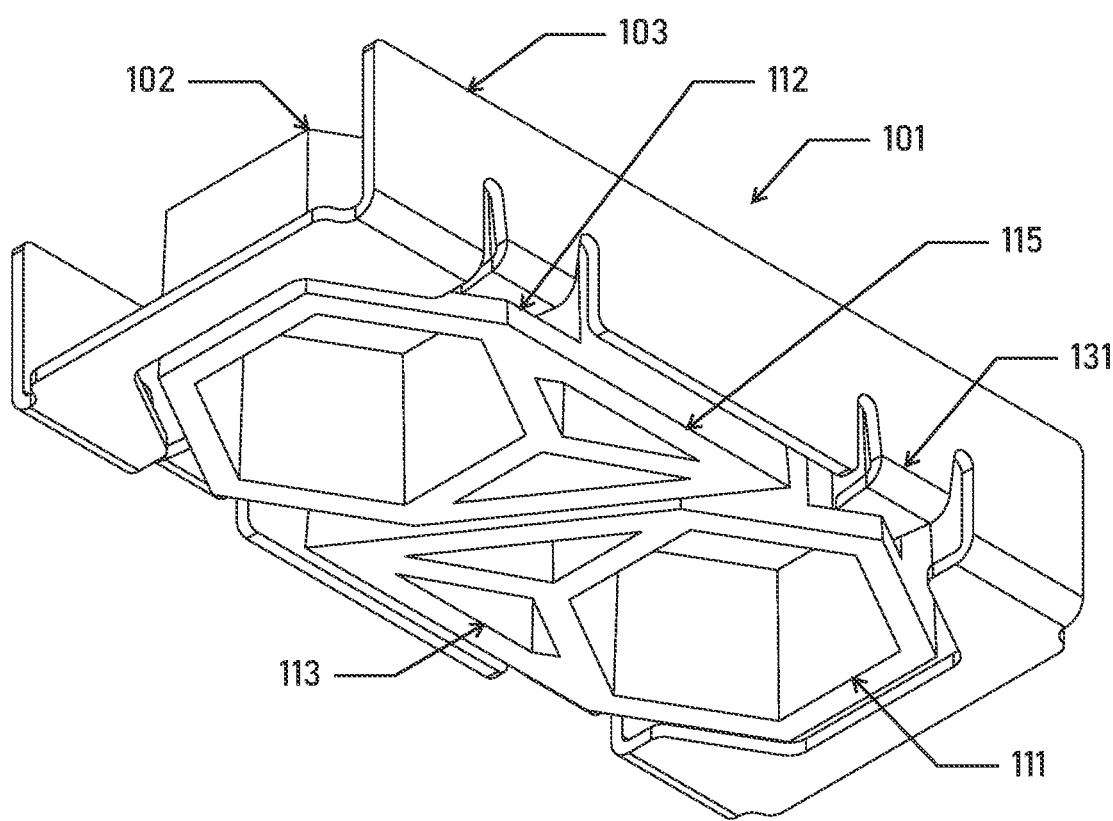

FIG. 3a and FIG. 3b show three-dimensional views of an embodiment of the disclosure.

Figure 3C:
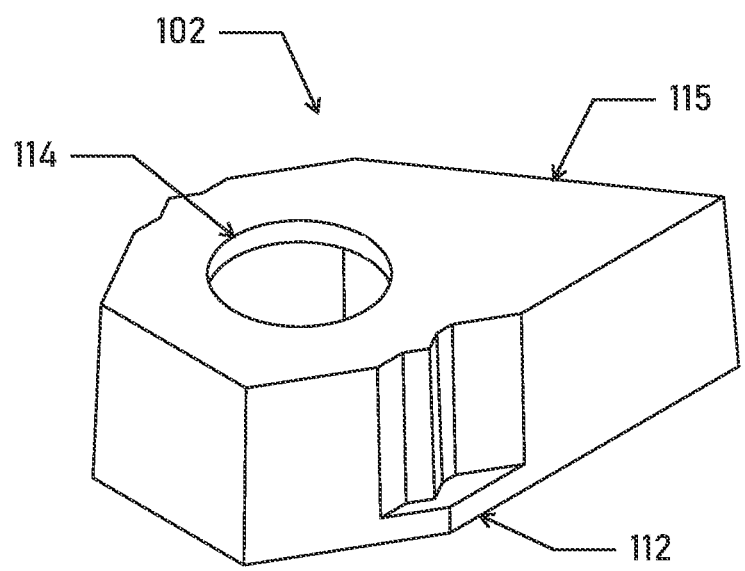

FIG. 3c shows a three-dimensional view of a single mobile portion in isolation according to FIG. 3a.

Figure 3D:
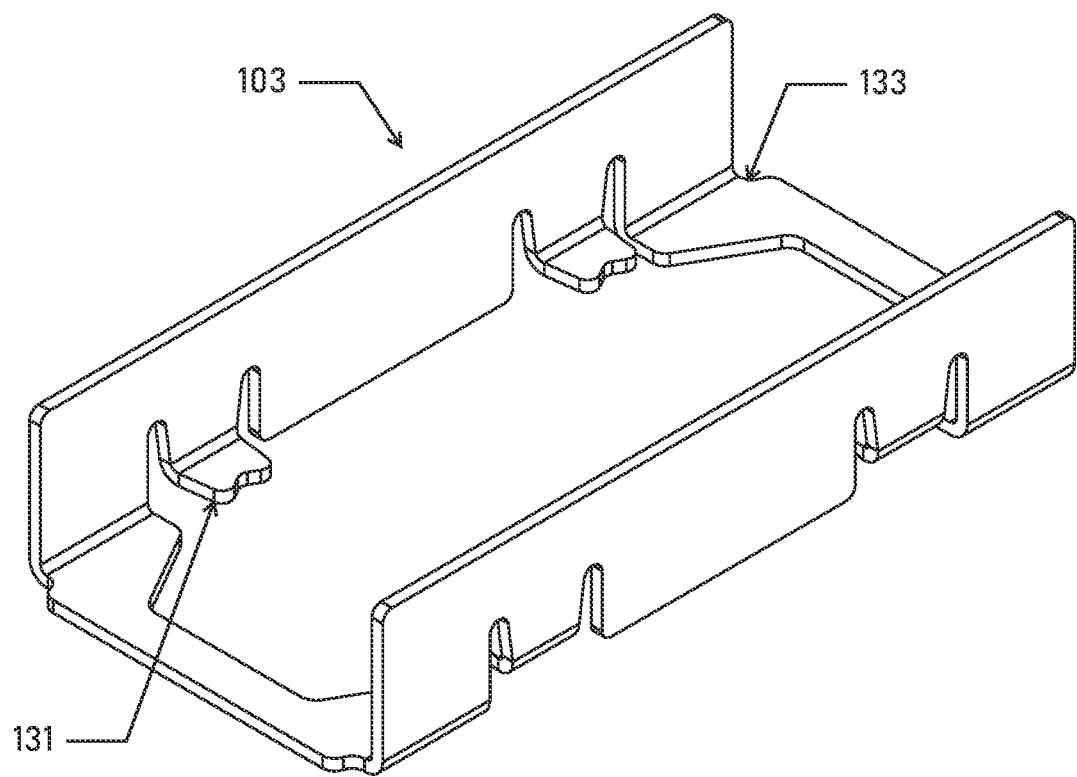

FIG. 3d shows a three-dimensional view of the fixed portion in isolation according to FIG. 3a.

The aspects illustrated in FIG. 3a, FIG. 3b, FIG. 3c, and FIG. 3d may include any other aspects as described herein. In this embodiment, there may be two implementations of the mobile portion 102, each implementation of the mobile portion 102 may include an implementation of the cavities 111, the protrusions 112, the one or more hollow portions 113, the holes 114, and the like. Additionally, this implementation of the mobile portion 102 may include an extended portion 115 or elongated portion.

In aspects, the extended portion 115 may be a portion of the mobile portion 102 that extends a greater distance from the holes 114 then one or more sides of the mobile portion 102. In aspects, the extended portion 115 may extend toward a side of the fixed portion 103 and may be adjacent an adjacent implementation of the extended portion 115 of another implementation of the mobile portion 102.

In aspects, the extended portion 115 may extend from the sides of the mobile portion 102 and terminate as a pointed portion. In this embodiment, the multiple implementations of the mobile portion 102 may be completely surrounded by a single implementation of the fixed portion 103, though other embodiments are envisioned where the fixed portion 103 may be located adjacent to, or partially surrounds one or more implementations of the mobile portion 102.

In aspects, each implementation of the mobile portion 102 may include the extended portion 115, which may be configured to contact the other implementation of the mobile portion 102 when acted on by a torque induced by a bolt being tightened with a nut within one of the cavities 111. In this regard, the torque may be resolved as a shear force in the shank of a bolt threaded with the nut in one of the cavities 111 of the other implementation of the mobile portion 102.

In aspects, the flexible protrusions 131 may include tips as illustrated in FIG. 3d. In aspects, the tips of the flexible protrusions 131 may be forked and the tips of the flexible protrusions 131 may be configured to contact an inner portion of the mobile portion 102 at its corners.

In aspects, the flexible protrusions 131 may have pointed tips and the mobile portion 102 may have recesses in the body of the mobile portion 102. In this aspect, the pointed tips of the flexible protrusions 131 may be configured to fit into the recesses in the body of the mobile portion 102.

Figure 4A:
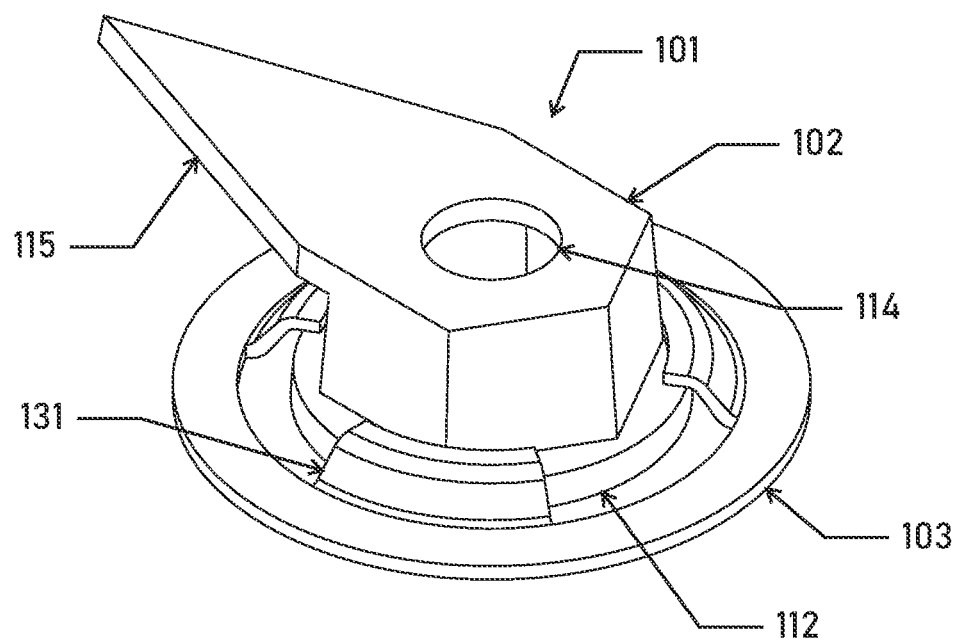
FIG. 4a and FIG. 4b show three-dimensional views of an embodiment of the disclosure.
Figure 4B:
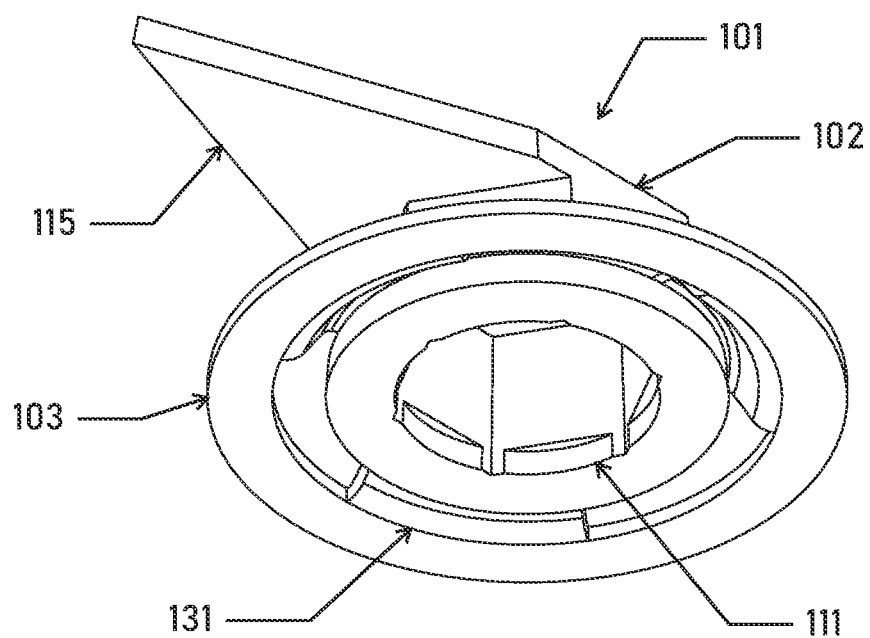

FIG. 4a and FIG. 4b show three-dimensional views of an embodiment of the disclosure.

Figure 4C:
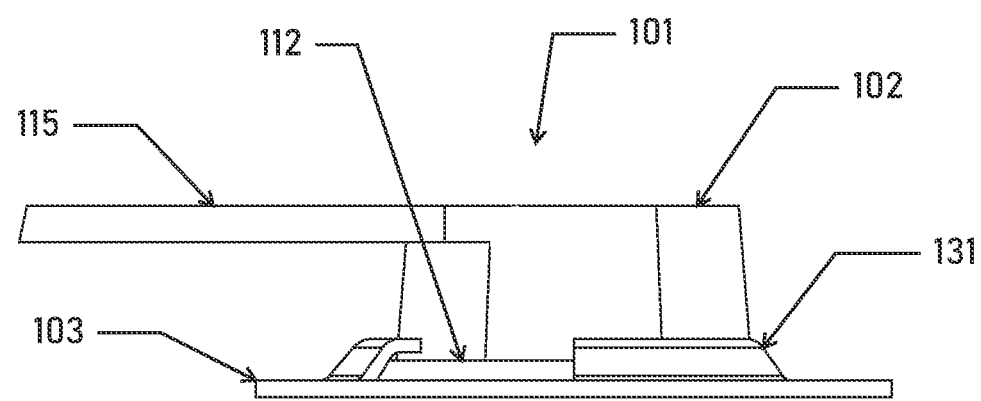

FIG. 4c shows an elevation view of the embodiment according to FIG. 4a.

Figure 4D:
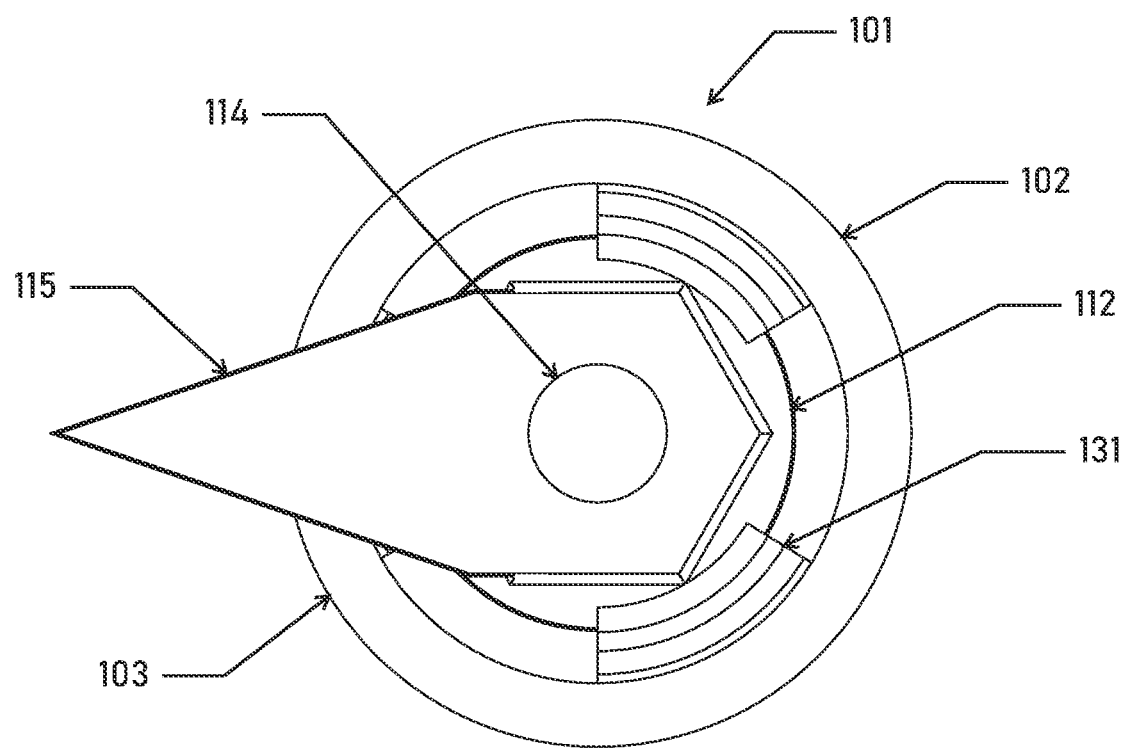

FIG. 4d shows a top view of the embodiment according to FIG. 4a.

The aspects illustrated in FIG. 4a, FIG. 4b, FIG. 4c, and FIG. 4d may include any other aspects as described herein. In this embodiment, the fixed portion 103 may surround a single implementation of the mobile portion 102 having a single implementation of one of the cavities 111. The single implementation of one of the cavities 111 may be configured to accept insertion of a washer in addition to a nut. The central portion of the mobile portion 102 may also include an elongated configuration of the extended portion 115. When torque is applied to a nut within an implementation of one of the cavities 111 of the mobile portion 102, the central portion of the mobile portion 102 may rotate until the elongated configuration of the extended portion 115 contacts other material—possibly but not necessarily an adjacent implementation of the nut restrainer 101—thereby preventing further rotation of the mobile portion 102 and allowing the bolt to be fully tightened with the nut within the single implementation of the cavities 111.

The fixed portion 103 may include the flexible protrusions 131, which may be configured to deform to allow lateral movement of the mobile portion 102, while holding the mobile portion 102 substantially flush to the substrate plate to which the fixed portion 103 may be attached by welding, adhesive, mechanical means, such as screws, and/or the like. The flexible protrusions 131 may be configured not to inhibit rotation of the central portion of the mobile portion 102 when a bolt is being tightened.

In each of the embodiments presented here, the flexible protrusions 131, which may be configured to hold the mobile portion 102 while allowing limited lateral movement in response to lateral forces, may be integral with the fixed portion 103.

However, embodiments where the flexible protrusions 131 may be integral with the mobile portion 102 are also envisioned. Embodiments with flexible connectors that are not integral to either the fixed portion 103 or the mobile portion 102, but which have the same function as the flexible protrusions 131 in the illustrated embodiments, to hold the mobile portion 102 in position with respect to the fixed portion 103 while allowing limited lateral movement in response to lateral forces, are also envisioned.

Figure 5A:
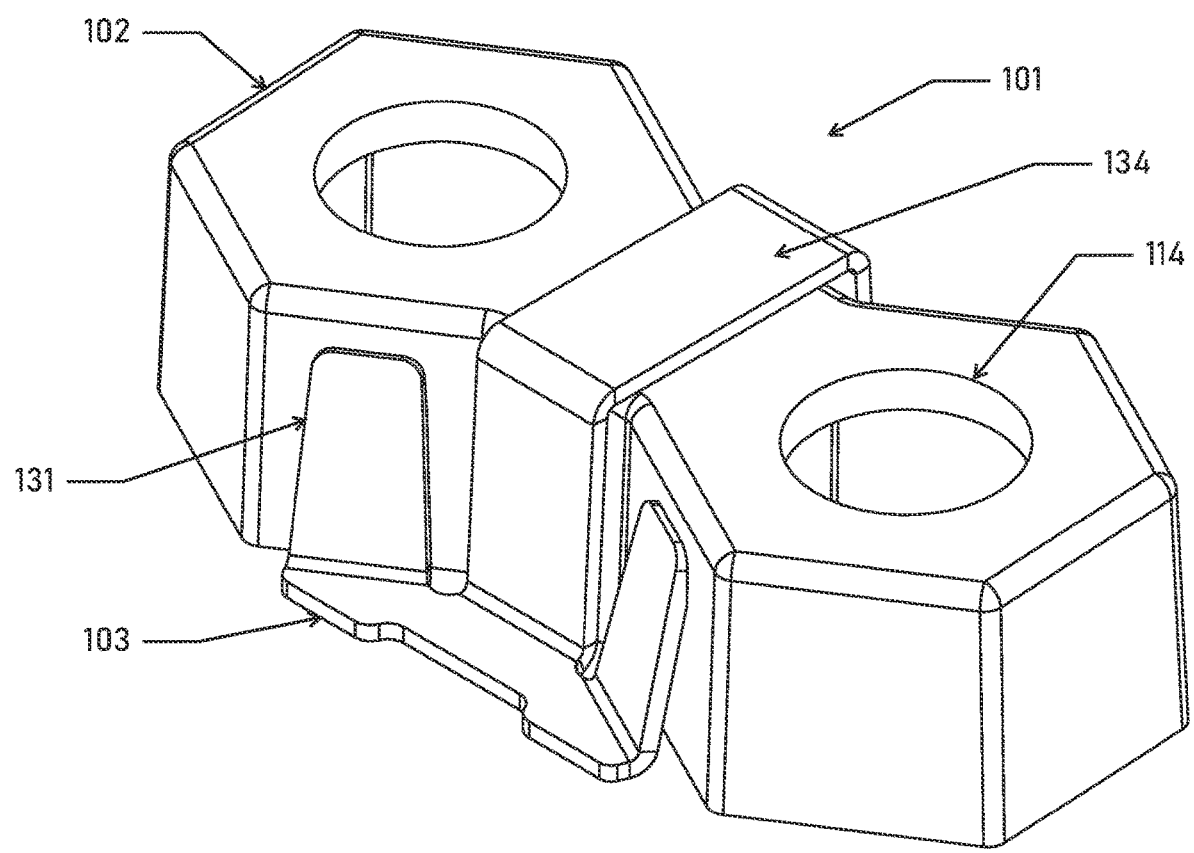
FIG. 5a shows three-dimensional view of an embodiment of the mobile portion and the fixed portion according to aspects of the disclosure.

FIG. 5a shows three-dimensional view of an embodiment of the mobile portion and the fixed portion according to aspects of the disclosure.

Figure 5B:
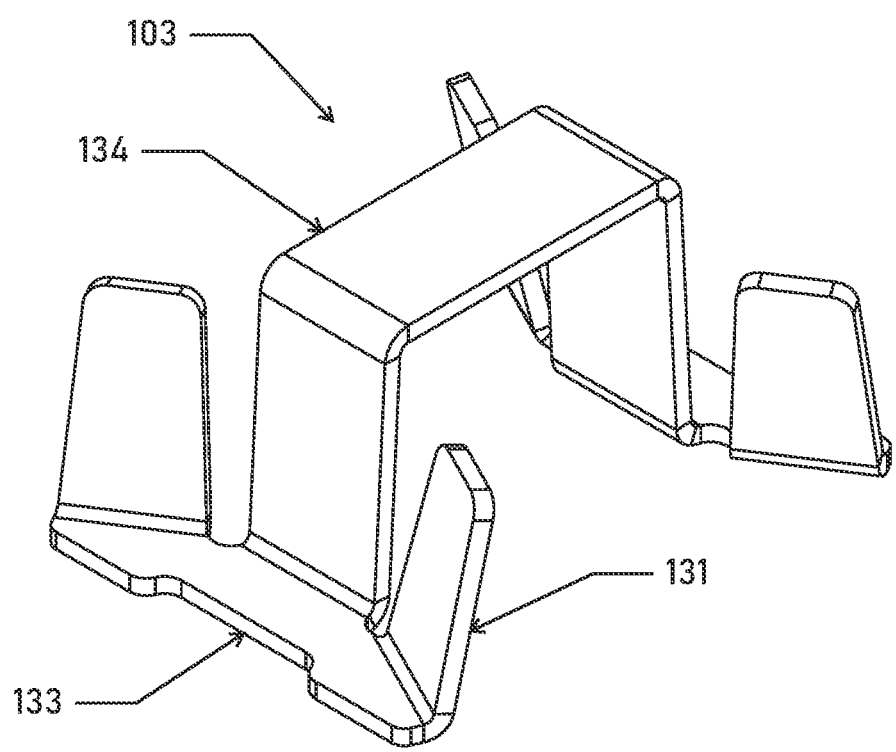

FIG. 5b shows a three-dimensional view of the fixed portion according to FIG. 5a.

Figure 5C:
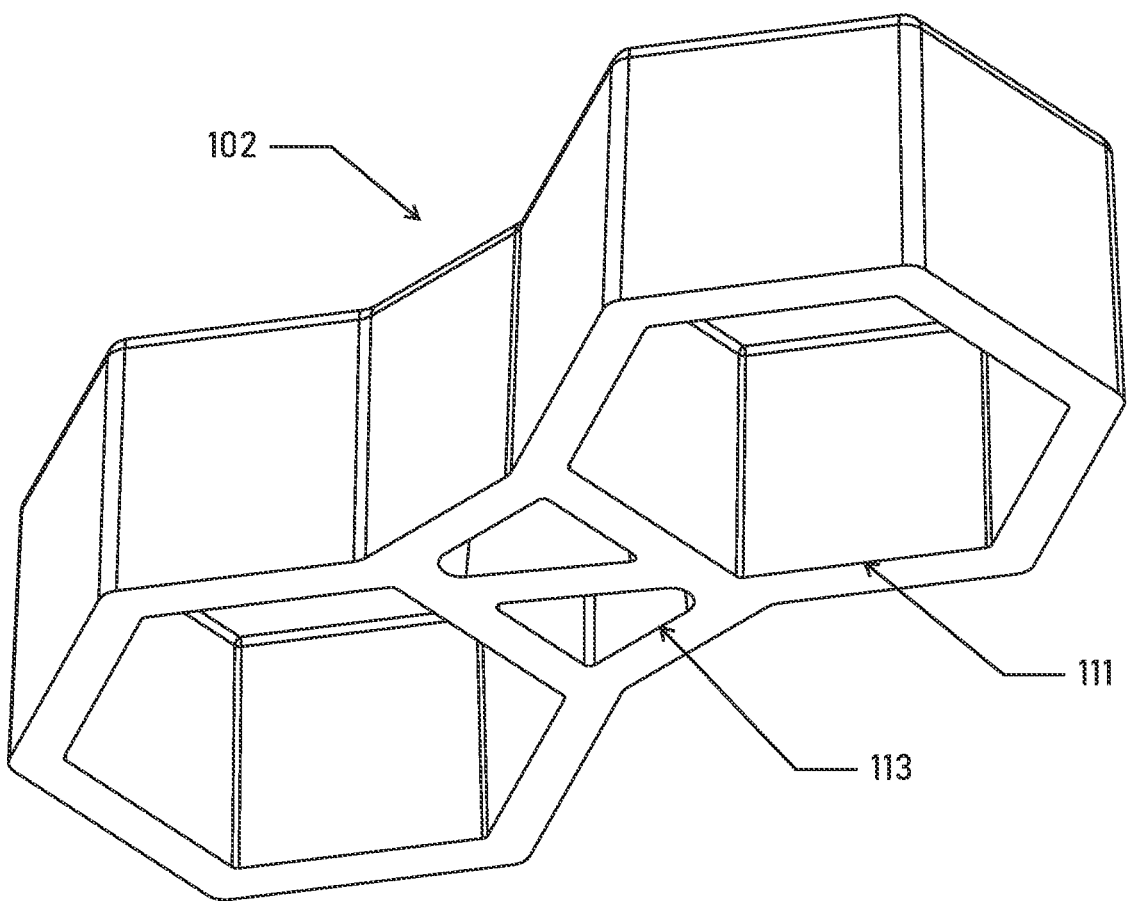

FIG. 5c shows a three-dimensional view of the mobile portion according to FIG. 5a.

The aspects illustrated in FIG. 5a, FIG. 5b, and FIG. 5c may include any other aspects as described herein. In particular, the mobile portion 102 may include any one or more the features as described herein.

In this regard, FIG. 5a shows three-dimensional view of an embodiment of the mobile portion 102 and the fixed portion 103 of the disclosure. In particular, the fixed portion 103 may be configured with a smaller form factor than the embodiments in FIG. 1, FIG. 2, and FIG. 3. The fixed portion 103 may include a central portion 134. The central portion 134 may have a top portion that may extend laterally across the top of the mobile portion 102. In this regard, the top portion of the central portion 134 may be structured and arranged such that there may be a gap between the top portion of the central portion 134 and the top surface of the mobile portion 102.

Additionally, the central portion 134 of the fixed portion 103 may include side portions that extend downwardly from the top portion of the central portion 134 along the sides of the mobile portion 102. In this regard, the side portions of the central portion 134 may be structured and arranged such that there may be a gap between the side portions of the central portion 134 and the sides of the mobile portion 102. Further, the side portions of the central portion 134 may extend downwardly to a base of the fixed portion 103. The base of the fixed portion 103 may be configured to be attached to the substrate as described herein. Moreover, the base of the fixed portion 103 may include the indentations 133 as described herein.

Further, the fixed portion 103 may include the flexible protrusions 131. In this regard, the flexible protrusions 131 may have all the same functionality as described herein. Further, the flexible protrusions 131 may extend from the base of the fixed portion 103 vertically upward and away from a surface of the substrate plate. In this regard, the flexible protrusions 131 may engage the mobile portion 102 as described herein.

As described herein, the nut restrainer 101 may be configured such that the fastener, such as a nut, cannot fall out. In this regard, the mobile portion 102 may be configured to stay held to the substrate plate by the fixed portion 103. In aspects, the nut restrainer 101 may be configured such that it restrains rotation of the fastener, such as a nut. In aspects, the nut restrainer 101 may be configured such that it is attachable to the substrate plate having a fastener hole, such as a bolt hole.

In aspects, the nut restrainer 101 may be configured such that the fixed portion 103 does not restrain rotation of the mobile portion 102 when tightening a fastener, such as a bolt. In this case, rotation may be restrained by contact between the mobile portion 102 and some material that is not part of the nut restrainer 101, such as for example direct or indirect contact with the bolt in the adjacent hole, as illustrated in FIG. 1, FIG. 2, and FIG. 3.

In aspects, the nut restrainer 101 may be configured to limit lateral movement of nut. For example, the nut stays reasonably aligned with the bolt hole so that it is positioned to accept the bolt. In aspects, the nut restrainer 101 may be configured with the holes 114, a hole, a void, an aperture, and/or the like to allow the tip of the bolt to extend past the nut. In aspects, the nut restrainer 101 may be configured with means of positioning to sufficiently align with the bolt hole. In particular, sufficient may depend on the other elements of the restrainer and fastener. In aspects, the nut restrainer 101 may be configured with some lateral movement to preserve tolerance and/or adjustability. For example, accept a bolt that is slightly off center.

In aspects, the nut restrainer 101 may be configured to accept off-the-shelf fasteners, such as nuts and bolts. For example, the functionality of the nut restrainer 101 is configured to not depend on any specific features of the nut, beyond being non-axisymmetric.

In aspects, the nut restrainer 101 may be configured to accept prismatic shaped nuts, polygonal shaped nuts, nuts having at least three flat side portions, nuts having at least four flat side portions, nuts having at least five flat side portions, nuts having at least six flat side portions, nuts having at least seven flat side portions, nuts having at least eight flat side portions, nuts having three flat side portions, nuts having four flat side portions, nuts having five flat side portions, nuts having six flat side portions, nuts having seven flat side portions, nuts having eight flat side portions, and/or the like.

In aspects, the nut restrainer 101 may be configured to arrange the fastener, such as nut, in contact with the substrate plate. In aspects, the nut restrainer 101 may be configured to arrange the fastener, such as nut, in direct contact with the substrate plate. In aspects, the nut restrainer 101 may be configured to be in contact with only one face of the substrate plate (as opposed to clipping over the side of the plate or into the bolt hole). In aspects, the nut restrainer 101 may be configured to be in contact with only one face of the substrate plate and the nut restrainer 101 is implemented without any structure for attachment to a side of the substrate plate. In aspects, the nut restrainer 101 may be configured to be in contact with only one face of the substrate plate and the nut restrainer 101 is implemented without any structure for attachment into the bolt hole of the substrate plate. In aspects, the nut restrainer 101 may be configured to be in contact with only one face of the substrate plate and the nut restrainer 101 is implemented without any structure for attachment to a side of the substrate plate or any structure for attachment into the bolt hole of the substrate plate. In aspects, the nut restrainer 101 may be configured such that no material (sleeves, gaskets, etc.) may be between the shank of the bolt and the edges of the holes in the plates.

This application incorporates by reference in its entirety U.S. patent application Ser. No. 16/846,283, filed Apr. 11, 2020 entitled "nut restrainer, and methods of use."

Accordingly, the disclosure has set forth a product that allows for the installation of high strength bolted connections from one side at low cost, without reductions in load-carrying capacity, while preserving installation tolerances, which would allow more efficient structures to be erected at a lower cost than is possible with welded connections.

The following are a number of nonlimiting EXAMPLES of aspects of the disclosure.

One EXAMPLE includes: a nut restrainer includes a mobile portion. The nut restrainer in addition includes a fixed portion. The nut restrainer moreover includes the mobile portion that may include at least one cavity configured to accept insertion of a nut and prevent rotation of the nut with respect to the mobile portion.

The above-noted EXAMPLE may further include any one or a combination of more than one of the following EXAMPLES: The nut restrainer of the above-noted EXAMPLE where the nut restrainer is configured to prevent the at least one nut from falling out. The nut restrainer of the above-noted EXAMPLE where the mobile portion is configured to be held to the substrate plate by the fixed portion. The nut restrainer of the above-noted EXAMPLE where the nut restrainer is configured to restrain rotation of the at least one nut. The nut restrainer of the above-noted EXAMPLE where the nut restrainer is configured to be attachable to a substrate having the at least one bolt hole. The nut restrainer of the above-noted EXAMPLE where the nut restrainer is configured to limit lateral movement of the at least one nut. The nut restrainer of the above-noted EXAMPLE may include at least one aperture to receive a tip of the at least one bolt. The nut restrainer of the above-noted EXAMPLE where the nut restrainer is configured to allow positioning and alignment with the at least one bolt hole. The nut restrainer of the above-noted EXAMPLE where the nut restrainer is configured to allow lateral movement of the mobile portion to preserve tolerance and/or adjustability. The nut restrainer of the above-noted EXAMPLE where the nut restrainer is configured to accept prismatic shaped nuts. The nut restrainer of the above-noted EXAMPLE where the nut restrainer is configured to arrange the at least one nut in contact with the substrate plate. The nut restrainer of the above-noted EXAMPLE where the nut restrainer is configured to be in contact with only one face of the substrate plate. The nut restrainer of the above-noted EXAMPLE where the nut restrainer is configured such that no material is arranged between a shank of the at least one bolt and edges of the at least one bolt hole in the substrate plate. The nut restrainer of the above-noted EXAMPLE where the at least one cavity is configured to accept insertion of a washer in addition to the at least one nut. The nut restrainer of the above-noted EXAMPLE where the mobile portion may include a plurality of implementations of the at least one cavity. The nut restrainer of the above-noted EXAMPLE where one of the plurality of implementations of the at least one cavity is configured to receive a first nut; where another one of the plurality of implementations of the at least one cavity is configured to receive a second nut; and where the mobile portion is configured such that the first nut resists application of torque when tightening the second nut. The nut restrainer of the above-noted EXAMPLE where at least one of the plurality of implementations of the at least one cavity is configured to accept insertion of a washer in addition to the at least one nut. The nut restrainer of the above-noted EXAMPLE where the fixed portion is configured to be welded the substrate plate. The nut restrainer of the above-noted EXAMPLE may include flexible protrusions configured to hold the mobile portion in a position where the at least one cavity is substantially concentric with the at least one bolt hole. The nut restrainer of the above-noted EXAMPLE where the flexible protrusions are arranged on the mobile portion. The nut restrainer of the above-noted EXAMPLE where the mobile portion may include protrusions that extend laterally from the mobile portion and engage with the flexible protrusions of the fixed portion. The nut restrainer of the above-noted EXAMPLE where the flexible protrusions are configured to deform. The nut restrainer of the above-noted EXAMPLE where the flexible protrusions are configured to reduce interference with one or more adjacent nut restrainers. The nut restrainer of the above-noted EXAMPLE may include cutouts configured to allow the flexible protrusions to move away from the mobile portion without contacting a fixed portion of a second implementation of the nut restrainer. The nut restrainer of the above-noted EXAMPLE where the flexible protrusions are bent at one or more locations. The nut restrainer of the above-noted EXAMPLE where the fixed portion may include the flexible protrusions configured to deform to allow lateral movement of the mobile portion. The nut restrainer of the above-noted EXAMPLE where the flexible protrusions are configured not to inhibit rotation of the mobile portion. The nut restrainer of the above-noted EXAMPLE where the flexible protrusions are configured to hold the mobile portion while allowing limited lateral movement. The nut restrainer of the above-noted EXAMPLE where the mobile portion may include protrusions that extend laterally from the mobile portion and into a gap between the substrate plate and the fixed portion. The nut restrainer of the above-noted EXAMPLE may include two or more implementations of the mobile portion having an implementation of the at least one cavity, protrusions, a hole, and an extended portion. The nut restrainer of the above-noted EXAMPLE where each implementation of the mobile portion may include the extended portion, which is configured to contact another implementation of the mobile portion. The nut restrainer of the above-noted EXAMPLE where a single implementation of one of the at least one cavity is configured to accept insertion of a washer in addition to a nut. The nut restrainer of the above-noted EXAMPLE where a central portion of the mobile portion may include an elongated configuration extending from the central portion. The nut restrainer of the above-noted EXAMPLE where the central portion of the mobile portion is configured to rotate until the elongated configuration contacts other material. The nut restrainer of the above-noted EXAMPLE where the fixed portion surrounds a single implementation of the mobile portion having a single implementation of one of the at least one cavity. The nut restrainer of the above-noted EXAMPLE may include flexible protrusions configured to allow lateral movement and further configured to be part of the mobile portion. The nut restrainer of the above-noted EXAMPLE where the fixed portion and the mobile portion are connected by at least one deformable connector that is configured to hold the mobile portion in place, allow the mobile portion to move laterally, and not resist a torque associated with tightening. The nut restrainer of the above-noted EXAMPLE where the fixed portion and the mobile portion may include a unitary structure where the fixed portion and the mobile portion are configured with a single piece of material.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto another element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over another element or intervening elements may also be present. In contrast, when an element is referred to as being "directly over" or extending "directly over"

another element, there are no intervening elements present. It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A nut restrainer configured to receive at least one nut, further configured to be affixed to a substrate plate having two sides, and further configured to be arranged over at least one bolt hole for subsequent installation of a at least one bolt, the nut restrainer comprising:
    a mobile portion;
    a fixed portion;
    the mobile portion comprises at least one cavity configured to accept insertion of a nut and prevent rotation of the nut with respect to the mobile portion; and
    flexible protrusions configured to hold the mobile portion in a position where the at least one cavity is substantially concentric with the at least one bolt hole, wherein the fixed portion is configured to be attached to the substrate plate.

2. The nut restrainer according to claim 1 wherein the fixed portion is configured to be attached to the substrate plate; and wherein the nut restrainer is configured to prevent the at least one nut from falling out.

3. The nut restrainer according to claim 1, wherein the mobile portion is configured to be held to the substrate plate by the fixed portion.

4. The nut restrainer according to claim 1 being configured to be implemented without any structure for attachment into the bolt hole of the substrate plate, wherein the nut restrainer is configured to restrain rotation of the at least one nut.

5. The nut restrainer according to claim 1 wherein the fixed portion is configured to allow the mobile portion to move a limited distance laterally without contacting any part of the fixed portion; and wherein the nut restrainer is configured to be attachable to a substrate having the at least one bolt hole.

6. The nut restrainer according to claim 1 wherein the fixed portion is configured to be attached to the substrate plate; and wherein the nut restrainer is configured to limit lateral movement of the at least one nut.

7. The nut restrainer according to claim 1 further comprising at least one aperture to receive a tip of the at least one bolt, wherein the fixed portion is configured to allow the mobile portion to move a limited distance laterally without contacting any part of the fixed portion.

8. The nut restrainer according to claim 1 being configured to be in contact with only one face of the substrate plate, wherein the nut restrainer is configured to allow positioning and alignment with the at least one bolt hole.

9. The nut restrainer according to claim 1 being configured to be implemented without any structure for attachment into the bolt hole of the substrate plate, wherein the nut restrainer is configured to allow lateral movement of the mobile portion to preserve tolerance and/or adjustability.

10. The nut restrainer according to claim 1 wherein the fixed portion is configured to be attached to the substrate plate; wherein the fixed portion is configured to allow the mobile portion to move a limited distance laterally without contacting any part of the fixed portion; and wherein the nut restrainer is configured to accept prismatic shaped nuts.

11. The nut restrainer according to claim 1 being configured to be in contact with only one face of the substrate plate, wherein the nut restrainer is configured to arrange the at least one nut in contact with the substrate plate.

12. The nut restrainer according to claim 1 being configured to be implemented without any structure for attachment into the bolt hole of the substrate plate, wherein the nut restrainer is configured to be in contact with only one face of the substrate plate.

13. The nut restrainer according to claim 1,
    wherein the nut restrainer is configured such that no material is arranged between a shank of the at least one bolt and edges of the at least one bolt hole in the substrate plate.

14. The nut restrainer according to claim 1 being configured to be implemented without any structure for attachment into the bolt hole of the substrate plate, wherein the fixed portion is configured to allow the mobile portion to move a limited distance laterally without contacting any part of the fixed portion; and wherein the at least one cavity is configured to accept insertion of a washer addition to the at least one nut.

15. The nut restrainer according to claim 1 being configured to be in contact with only one face of the substrate plate, wherein the mobile portion comprises a plurality of implementations of the at least one cavity.

16. The nut restrainer according to claim 15 wherein the fixed portion is configured to allow the mobile portion to move a limited distance laterally without contacting any part of the fixed portion; wherein one of the plurality of implementations of the at least one cavity is configured to receive a first nut; wherein another one of the plurality of implementations of the at least one cavity is configured to receive a second nut; and wherein the mobile portion is configured such that the first nut resists application of torque when tightening the second nut.

17. The nut restrainer according to claim 15 being configured to be in contact with only one face of the substrate plate, wherein at least one of the plurality of implementations of the at least one cavity is configured to accept insertion of a washer in addition to the at least one nut.

18. The nut restrainer according to claim 1 wherein the fixed portion is configured to allow the mobile portion to move a limited distance laterally without contacting any part of the fixed portion; and wherein the fixed portion is configured to be welded the substrate plate.

19. The nut restrainer according to claim 1 further comprising two or more implementations of the mobile portion comprising an implementation of the at least one cavity, protrusions, a hole, and an extended portion, wherein the fixed portion is configured to allow the mobile portion to move a limited distance laterally without contacting any part of the fixed portion.

20. The nut restrainer according to claim 19 wherein a single implementation of one of the at least one cavity is configured to accept insertion of a washer in addition to a nut.

21. The nut restrainer according to claim 1 being configured to be implemented without any structure for attachment into the bolt hole of the substrate plate, wherein the fixed portion surrounds a single implementation of the mobile portion having a single implementation of one of the at least one cavity.

22. The nut restrainer according to claim 21 wherein a central portion of the mobile portion comprises an elongated configuration extending from the central portion.

23. The nut restrainer according to claim 22 wherein the central portion of the mobile portion is configured to rotate until the elongated configuration contacts other material.

24. The nut restrainer according to claim 1 being configured to be implemented without any structure for attachment into the bolt hole of the substrate plate, wherein the fixed portion and the mobile portion comprise a unitary structure where the fixed portion and the mobile portion are configured with a single piece of material.

25. A nut restrainer configured to receive at least one nut, further configured to be affixed to a substrate plate having two sides, and further configured to be arranged over at least one bolt hole for subsequent installation of a at least one bolt, the nut restrainer comprising:
   a mobile portion;
   a fixed portion; and
   the mobile portion comprises at least one cavity configured to accept insertion of a nut and prevent rotation of the nut with respect to the mobile portion,
   wherein the mobile portion comprises protrusions that extend laterally from the mobile portion and into a gap between the substrate plate and the fixed portion.

26. The nut restrainer according to claim 25 further comprising flexible protrusions configured to hold the mobile portion in a position where the at least one cavity is substantially concentric with the at least one bolt hole, wherein the fixed portion is configured to be attached to the substrate plate.

27. The nut restrainer according to claim 26 being configured to be in contact with only one face of the substrate plate, wherein the flexible protrusions are arranged on the mobile portion.

28. The nut restrainer according to claim 26 wherein the fixed portion is configured to be attached to the substrate plate; and wherein the flexible protrusions are arranged on the fixed portion.

29. The nut restrainer according to claim 28 wherein the flexible protrusions are configured to deform.

30. The nut restrainer according to claim 28 wherein the flexible protrusions are configured to reduce interference with one or more adjacent nut restrainers.

31. The nut restrainer according to claim 28 further comprising cutouts configured to allow the flexible protrusions to move away from the mobile portion without contacting a fixed portion of a second implementation of the nut restrainer.

32. The nut restrainer according to claim 28 wherein the flexible protrusions are bent at one or more locations.

33. The nut restrainer according to claim 26 wherein the fixed portion is configured to allow the mobile portion to move a limited distance laterally without contacting any part of the fixed portion; and wherein the mobile portion comprises protrusions that extend laterally from the mobile portion and engage with the flexible protrusions of the fixed portion.

34. The nut restrainer according to claim 26 wherein the flexible protrusions are configured to deform to allow lateral movement of the mobile portion.

35. The nut restrainer according to claim 26 wherein the flexible protrusions are configured not to inhibit rotation of the mobile portion.

36. The nut restrainer according to claim 26 wherein the flexible protrusions are configured to hold the mobile portion while allowing limited lateral movement.

37. A nut restrainer configured to receive at least one nut, further configured to be affixed to a substrate plate having two sides, and further configured to be arranged over at least one bolt hole for subsequent installation of a at least one bolt, the nut restrainer comprising:
   a mobile portion;
   a fixed portion;
   the mobile portion comprises at least one cavity configured to accept insertion of a nut and prevent rotation of the nut with respect to the mobile portion; and
   the nut restrainer being configured to be implemented without any structure for attachment into the bolt hole of the substrate plate,
   wherein each implementation of the mobile portion comprises an extended portion, which is configured to contact another implementation of the mobile portion.

* * * * *